United States Patent [19]
Berfield

[11] Patent Number: 5,855,634
[45] Date of Patent: Jan. 5, 1999

[54] FILTER RETAINER FOR A VACUUM CLEANER

[75] Inventor: Robert C. Berfield, Jersey Shore, Pa.

[73] Assignee: Shop Vac Corporation, Williamsport, Pa.

[21] Appl. No.: 881,423

[22] Filed: Jun. 24, 1997

[51] Int. Cl.[6] .................................................. B01D 27/08
[52] U.S. Cl. ................... 55/472; 55/476; 55/490; 55/498; 55/510; 55/DIG. 3; 210/232; 210/450
[58] Field of Search ............................. 55/467, 471, 472, 55/476, 490, 498, 502, 510, 379, DIG. 3; 210/232, 450; 215/209, 220

[56] References Cited

U.S. PATENT DOCUMENTS

| | | |
|---|---|---|
| 2,296,359 | 9/1942 | Martinet ..................................... 55/471 |
| 3,016,984 | 1/1962 | Getzin . |
| 3,082,465 | 3/1963 | Wood ........................................ 55/471 |
| 3,597,902 | 8/1971 | Williams ................................... 55/467 |
| 3,775,951 | 12/1973 | Eicholz et al. ........................... 55/467 |
| 3,906,584 | 9/1975 | Hult . |
| 3,961,921 | 6/1976 | Heiman et al. . |
| 4,103,797 | 8/1978 | Morris ..................................... 215/209 |
| 4,185,974 | 1/1980 | Hiester ..................................... 55/472 |
| 4,199,334 | 4/1980 | Berkhoel . |
| 4,353,473 | 10/1982 | Morris ..................................... 215/220 |
| 4,609,387 | 9/1986 | Berfield et al. . |
| 4,613,348 | 9/1986 | Natale . |
| 4,623,366 | 11/1986 | Berfield et al. ........................... 55/471 |
| 4,650,504 | 3/1987 | Howeth . |
| 4,749,386 | 6/1988 | Strohmeyer et al. . |
| 4,756,727 | 7/1988 | Howeth . |
| 4,765,811 | 8/1988 | Beckon . |
| 4,874,404 | 10/1989 | Boswell . |
| 4,906,265 | 3/1990 | Berfield . |
| 4,997,466 | 3/1991 | Hood . |
| 5,032,155 | 7/1991 | Wiese et al. . |
| 5,066,318 | 11/1991 | McDonough . |
| 5,069,696 | 12/1991 | Bruno, III . |
| 5,243,733 | 9/1993 | Steiner et al. . |
| 5,344,559 | 9/1994 | Van Ooijen . |
| 5,400,464 | 3/1995 | Steiner . |
| 5,531,802 | 7/1996 | Schlör et al. . |
| 5,641,343 | 6/1997 | Frey ......................................... 55/471 |
| 5,753,117 | 5/1998 | Jiang ....................................... 210/232 |

FOREIGN PATENT DOCUMENTS

| | | |
|---|---|---|
| 2145562 | 5/1996 | Canada . |
| 0 562 502 | 9/1993 | European Pat. Off. . |
| 27458 | 6/1955 | Finland .................................... 55/471 |
| 54-465 | 1/1979 | Japan . |

*Primary Examiner*—Jay H. Woo
*Assistant Examiner*—Minh-Chau T. Pham
*Attorney, Agent, or Firm*—Marshall, O'Toole, Gerstein, Murray & Borun

[57] ABSTRACT

A filter retainer for a vacuum cleaner includes a filter cage having several ribs. At the bottom of the filter cage is a lip which includes a plurality of notches. A cylindrical filter having open ends is slid over the filter cage. A cap is placed at the bottom of the filter in order to hold the filter to the filter cage. The cap has a pair of ramps which engage notches on the rim of the filter cage. As the cap is rotated, the cap is pushed towards the filter so that a lip on the cap engages a bottom of the filter.

19 Claims, 4 Drawing Sheets

FILTER RETAINER FOR A VACUUM CLEANER

FIELD OF THE INVENTION

The present invention relates generally to vacuum cleaners, and more particularly to devices for holding filters in place on a vacuum cleaner.

BACKGROUND OF THE INVENTION

Vacuum cleaners generally include a motor which drives an air impeller to create a low pressure area inside of a tank or other receptacle. The tank has an inlet through which dust and debris or liquid material enter into the tank, usually from a hose. When liquid is being suctioned into the tank, it is not generally necessary to have a filter between the tank and the air impeller. For instance, in U.S. Pat. No. 4,906,265, a foam cuff 30 fits over a filter cage 20 during wet operations. When the vacuum cleaner is used on dry materials, a paper or cloth filter is placed over the foam cuff and attached with a ring. The paper or cloth filter then minimizes the amount of particulate material which escapes from the tank and passes to the air impeller. Dust or debris in the air impeller is undesirable because it may interfere with the operation of the air impeller or motor, and the dust or debris may be exhausted back out into the room.

While cloth or flat paper filters may be satisfactory, it is often desirable to use a cylindrical pleated filter for some types of vacuuming. Cylindrical or cartridge filters have a large filtering surface area and may be made of a variety of filtering materials. It has therefore been known to use a cylindrical filter with an open top and a closed bottom which is inserted over a filter cage. The top of the filter may be made of a flexible material such as rubber so that when the filter is pushed over the filter cage, the flexible material deforms and frictionally holds the filter in place.

Other systems use cylindrical filters which are open at both ends. Such filters may fit over a filter cage having a closed bottom in order to prevent material from passing around the filter and into the air impeller. Other open-ended filters may use a retainer of some type which holds the filter in place and closes the open end of the filter.

SUMMARY OF THE INVENTION

In accordance with one aspect of the present invention, a retainer for a filter in a vacuum cleaner includes a rim having a plurality of notches and a cap having a base and a lip. The base has at least one ramp and the ramp engages the rim in a notch to force the lip toward the filter when the cap is rotated.

The cap may have two ramps, the base may be cylindrical and the end of the base may be closed by a plate. The ramp may not extend all the way to the plate. The plate may be generally parallel to the rim and there may be a wall attached to the plate for rotating the cap.

The rim may be located at the first end of an enclosure, where the filter surrounds the enclosure. The enclosure may have a plurality of ribs, and each notch may be located adjacent an end of the ribs.

The filter retainer is used in combination with a filter, which may be cylindrical, with a gasket at each end of the filter and pleated filter material between the gaskets.

Other features and advantages are inherent in the filter retainer claimed and disclosed or will become apparent to those skilled in the art from the following detailed description in conjunction with the accompanying drawings.

DETAILED DESCRIPTION OF THE PREFERRED EMBODIMENT

Figure 1:
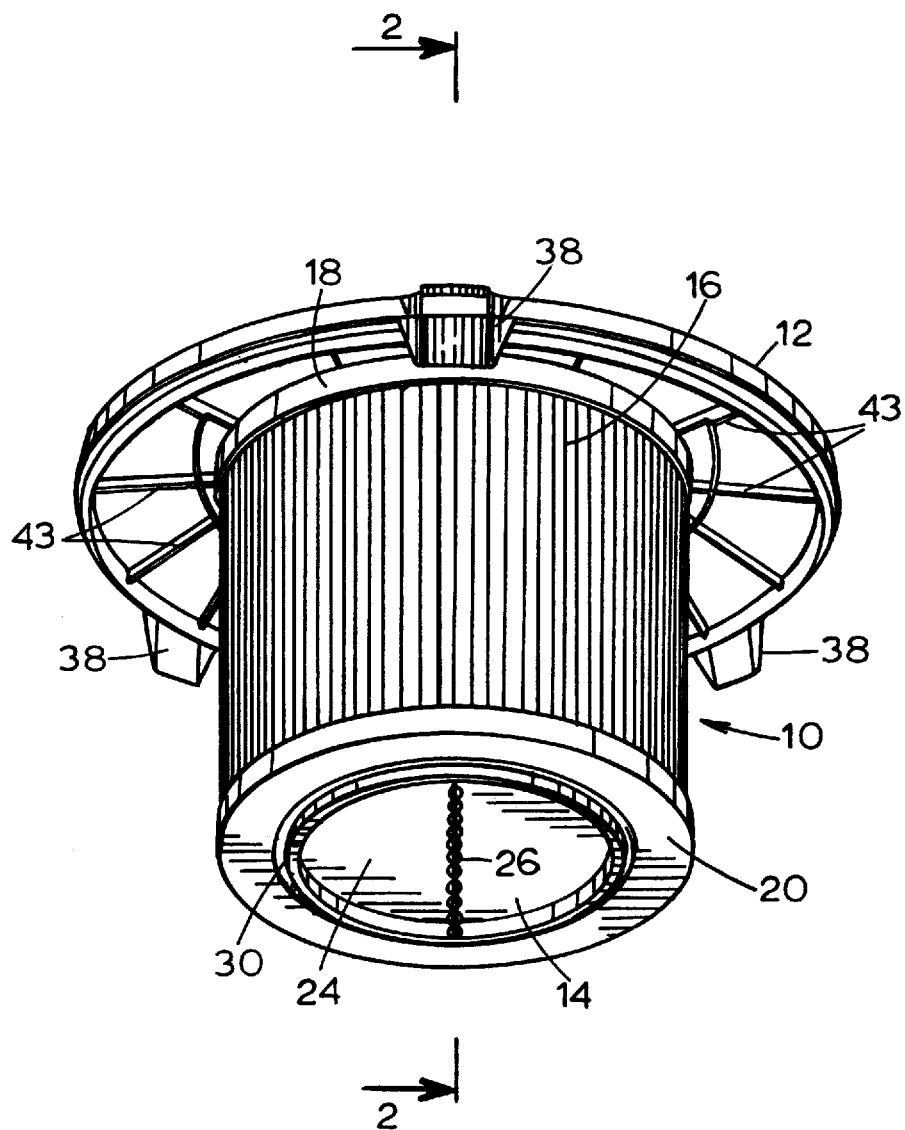
FIG. 1 is a perspective view of a filter and filter retainer of the present invention.

Referring initially to FIG. 1, a filter indicated generally at 10 is held to a tank lid 12 by a cap 14. The filter 10 is an open-ended cylinder with one of the ends covered by the cap 14. The filter may be made of a variety of materials including pleated paper 16 held together with a top gasket 18 and a bottom gasket 20. A wire mesh (not depicted) may be placed on the inside of the filter paper 16 in order to provide rigidity to the filter 10. A variety of filters 10 and filter materials may be used including those manufactured by Donaldson Company. The precise construction of the filter will depend on the type of material which is being vacuumed and the size of the filter cage.

Figure 4:
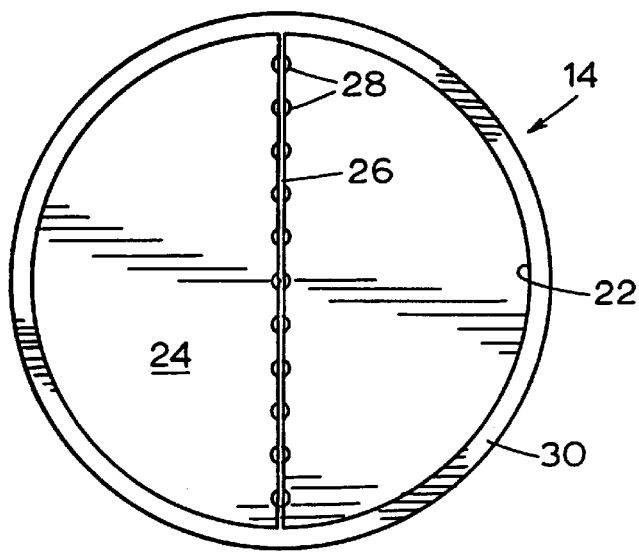
FIG. 4 is a bottom plan view of the filter retainer cap of the present invention.
Figure 5:
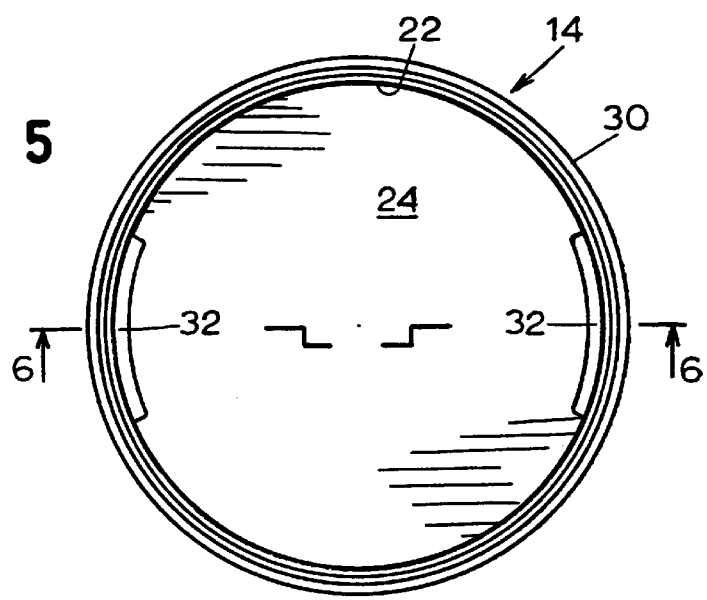
FIG. 5 is a top plan view of the filter retainer cap of FIG. 4.
Figure 6:
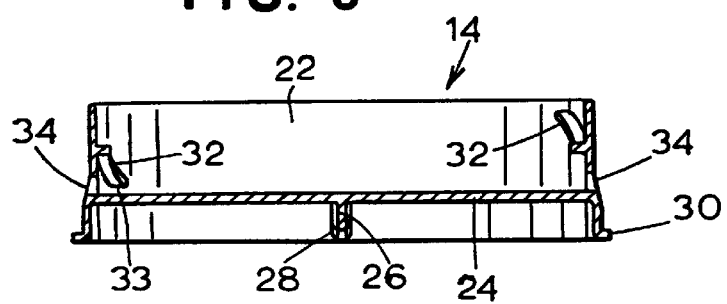
FIG. 6 is a cross-sectional view taken along the line 6—6 of FIG. 5.

As best seen in FIGS. 4–6, the cap 14 consists of a cylindrical base 22, which is closed near one end by a plate 24. Attached to the plate 24 is a wall 26 which may be reinforced with a plurality of pegs 28. The wall is designed to be gripped by a user for rotation of the cap 14. Along one edge of the cap 14 is a lip 30 which protrudes out from the circumference of the base 22. On the inside of the base 22 are two ramps 32. The ramps 32 are angled and extend almost to the bottom of the base 22 and almost to the plate 24. Because the ramps 32 do not extend to the plate 24, a gap 33 (FIG. 6) is formed between each ramp 32 and the plate 24. Beneath each ramp 32 is an aperture 34 which allows water to drain from inside the cap 14 if the cap 14 is in place when the vacuum cleaner is used for wet operations. The cap is shown with the wall 26 extending perpendicular to a line connecting the centers of the ramps 32. It may be desirable for the wall 26 to extend parallel to such a line.

Figure 2:
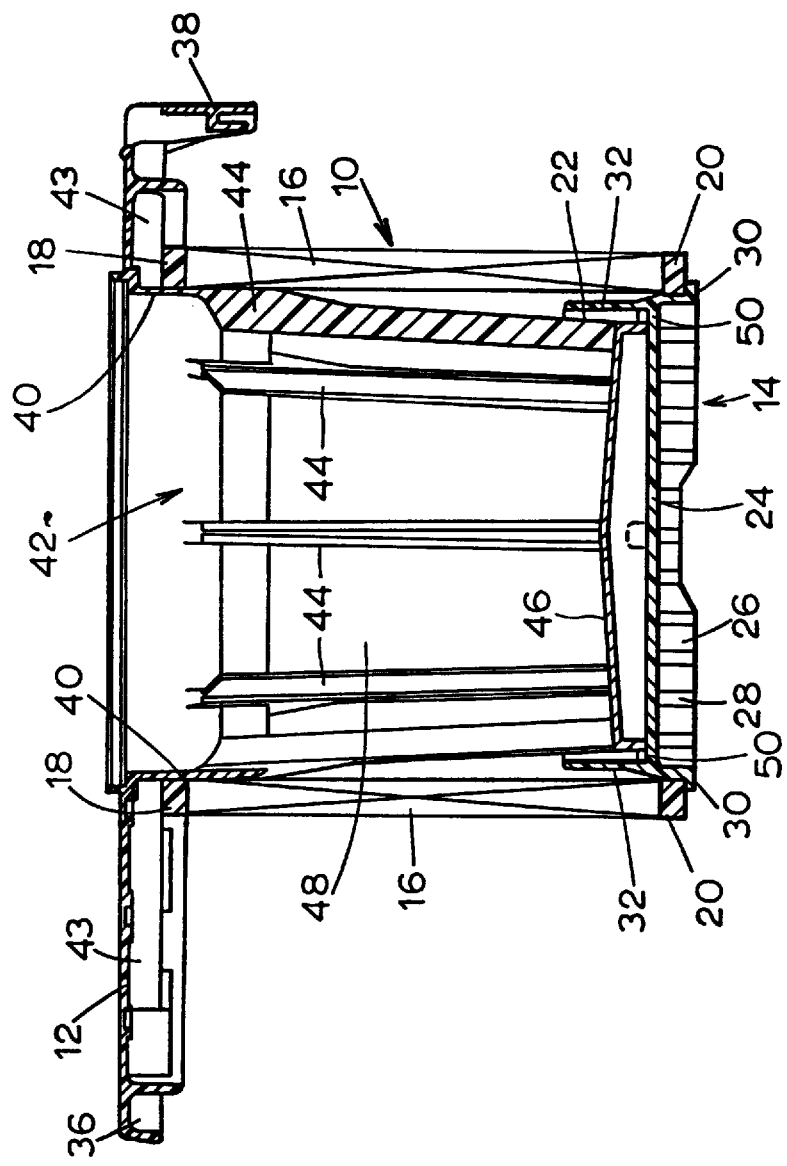
FIG. 2 is a cross-sectional view of the filter and filter retainer taken along the line 2—2 of FIG. 1.
Figure 3:
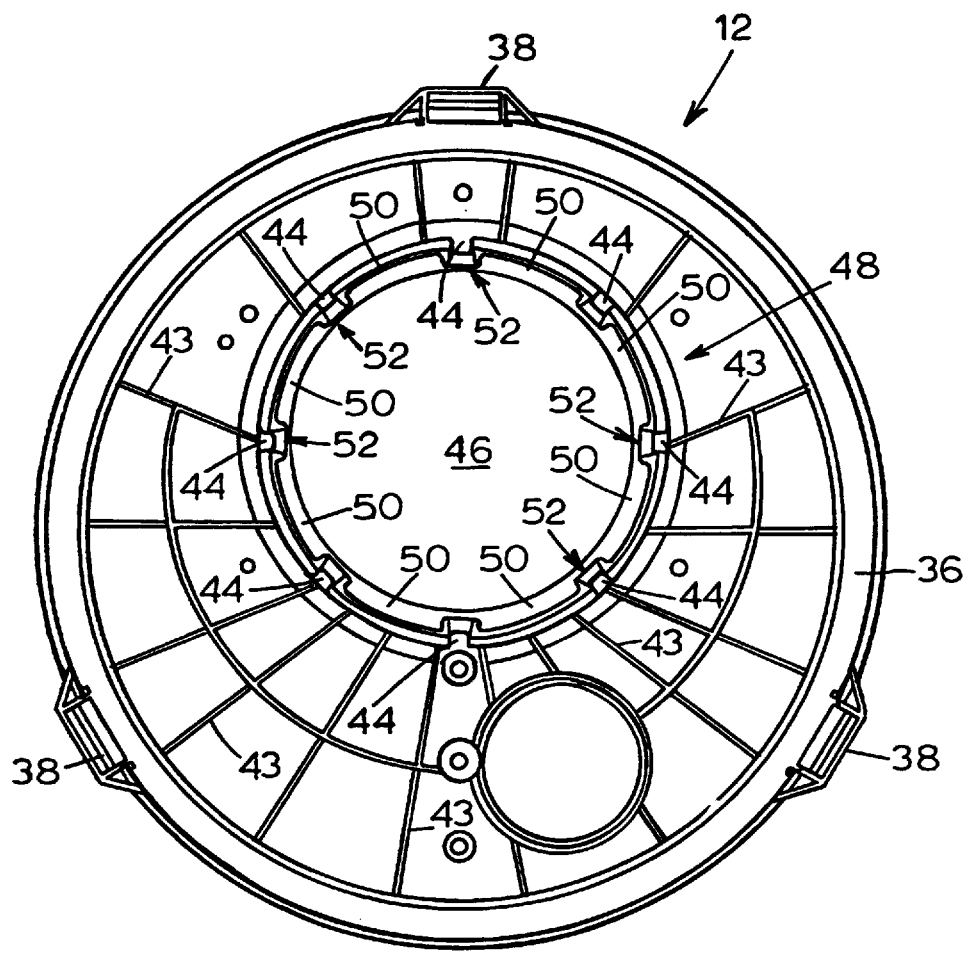
FIG. 3 is a bottom plan view of a tank lid including a filter cage.

Referring now to FIGS. 2 and 3, the tank lid 12 has a rim 36 which is designed to fit over the edge of a tank-type receptacle (not depicted) for a vacuum cleaner. Around the periphery of the tank lid 12 are several latch ports 38 which cooperate with latches (not depicted) on the tank in order to hold the tank lid to the tank. Ordinarily, the tank lid 12 is bolted to a filter housing which contains a motor air impeller and associated equipment (not depicted). The tank lid 12 has a wall 40 which defines an opening 42 through which air is drawn by the air impeller of the vacuum cleaner. All across the bottom of the tank lid 12 are short support walls 43 which provide strength to the lid.

Attached to the wall 40 of the tank lid 12 are several ribs 44 which extend downward and are attached to a lower wall 46. Together the ribs 44 and the lower wall 46 define an enclosure or filter cage 48. As best seen in FIG. 3, extending outward from the bottom of the lid cage 48 is a rim 50 which is interrupted by a plurality of notches 52. Each notch is located adjacent on end of a rib 44.

The tank lid 12 and associated filter cage 48 have been used substantially shown by the assignee of the present application, Shop Vac Corporation, in a variety of its vacuum cleaners. The notches 52 were previously placed in the rim 50 in order to more easily mold the tank lid 12. The cap 14 and the tank lid 12 may each be made of polypropylene.

Referring to FIG. 2, when a user wishes to use the filter 10, the filter 10 is slid over the filter cage 48. In order to slide the filter 10 over the lid cage 48, the cap 14 must be removed from the filter cage 48. When the filter has been pushed up sufficiently that the top gasket 18 contacts one of the support walls 43 on the tank lid 12, the filter is in place. The top gasket 18 is then in contact with the wall 40 to form a seal preventing air and dust from passing around the upper gasket 18, into the lid cage 48, and through the aperture 42.

Once the filter has been fully inserted, the cap 14 is placed adjacent the lower wall 46 of the filter cage 48. The base 22 has a diameter larger than the lower plate 46 and the rim 50, but a smaller diameter than the filter 10. As the cap 14 is inserted over the rim 50 of the filter cage 48, the ramps 32 on the cap 14 engage the lip 30. Once the ramps 32 engage the lip 30, the cap 14 must be rotated (clockwise) so that the ramps 32 enter two notches 52 on opposite sides of the filter cage 48 (FIG. 3). As the cap 14 continues to be rotated, the ramps pull the cap 14 upward until the lip 30 on the cap 14 engages the bottom gasket 20 on the filter 10. Since the bottom gasket 20 is made of a deformable material such as rubber, a seal is formed between the cap 14 and the lower gasket 20, thereby preventing air or debris from being drawn into the filter cage 48 without first passing through the filtering paper 16. As seen in FIG. 6, the ramps 32 do not extend all the way to the plate 24 so that the lip 30 may pass between the ramp 32 and the plate 24 at the gap 33.

When the filter 10 is to be removed, the cap 14 is rotated (counterclockwise). The ramps 32 engage the notches 52 and force the cap 14 away from the filter 10. Once the cap 14 has entirely disengaged from the rim 50 and notches 52, the cap 14 is removed. The filter 10 may then be removed from the filter cage 48.

The design of the present invention advantageously seals the bottom of a filter with a minimum of complexity. Moreover, the filter retainer utilizes the lip 30 and notches 52 which were already present in the design of the filter cage as used in the prior art. Thus, no changes to the tank lid 12 and its associated filter cage 48 were necessary in order to retain the filter.

The foregoing detailed description has been given for clearness of understanding only, and no unnecessary limitations should be understood therefrom, as modifications would be obvious to those skilled in the art.

I claim:

1. A retainer for a filter in a vacuum cleaner, the retainer comprising:

a stationary member adjacent a first end of a filter;

a rim having a plurality of notches spaced from the stationary member;

a cap having a base and a lip located adjacent a second end of the filter;

at least one ramp on the base wherein the ramp engages the rim in a notch to force the lip toward the filter when the cap is rotated.

2. The filter retainer of claim 1 wherein the cap has two ramps.

3. The filter retainer of claim 1 wherein:

the base is cylindrical; and an end of the base is closed by a plate.

4. The filter retainer of claim 3 wherein the ramp does not extend to the plate.

5. The filter retainer of claim 3 wherein the plate is generally parallel to the rim.

6. The filter retainer of claim 3 comprising a wall attached to the plate for rotating the cap.

7. The filter retainer of claim 1 wherein:

the vacuum cleaner comprises an enclosure having an end; and the rim of the filter retainer is located adjacent the end and the filter surrounds the enclosure.

8. The filter retainer of claim 7 wherein the enclosure comprises a plurality of ribs.

9. The filter retainer of claim 8 wherein each notch is located adjacent an end of the ribs.

10. The filter retainer of claim 1 in combination with the filter.

11. The filter retainer of claim 10 wherein:

the filter is cylindrical;

the filter has a gasket at each end of the filter; and the filter has pleated filter material between the gaskets.

12. A retainer for a filter in a vacuum cleaner comprising:

a lid;

a cage attached to the lid having a plurality of ribs wherein the ribs are generally parallel to each other;

a rim spaced from the lid connected the ribs;

notches in the rim, wherein the notches are located adjacent ends of the ribs;

a cap having a base and a lip wherein the cap is spaced from the lid; and at least one ramp on the base, wherein the ramp engages the rim in a notch to force the lip toward the ribs when the cap is rotated.

13. The filter retainer of claim 12 wherein the cap has two ramps.

14. The filter retainer of claim 12 wherein:

the base is cylindrical; and an end of the base is closed by a plate.

15. The filter retainer of claim 14 wherein the ramp does not extend to the plate.

16. The filter retainer of claim 14 wherein the plate is generally parallel to the rim.

17. The filter retainer of claim 14 comprising a wall attached to the plate for rotating the cap.

18. The filter retainer of claim 12 in combination with the filter.

19. The filter retainer of claim 18 wherein:

the filter is cylindrical;

the filter has a gasket at each end of the filter; and the filter has pleated filter material between the gaskets.

* * * * *